United States Patent [19]
Hühne et al.

[11] Patent Number: 5,535,953
[45] Date of Patent: Jul. 16, 1996

[54] INJECTOR TIP FOR BURNING AGGREGATES

[76] Inventors: Erwin Hühne, Scheuerleweg 14, 79227, Schallstadt, Germany; Franz Künzli, Hegnau-Strasse 55, 8602 Wangen bei Dübendorf, Switzerland

[21] Appl. No.: 156,916

[22] Filed: Nov. 24, 1993

[30] Foreign Application Priority Data

Nov. 27, 1992 [DE] Germany .................. 42 39 903.3

[51] Int. Cl.$^6$ ........................................ F23D 14/38
[52] U.S. Cl. .................. 239/419.3; 239/427.5; 239/428
[58] Field of Search ............. 239/419.3, 427.5, 239/428

[56] References Cited

U.S. PATENT DOCUMENTS

| | | | |
|---|---|---|---|
| 2,695,660 | 11/1954 | Rummler | 239/419.3 |
| 4,022,383 | 5/1977 | Zeley | 239/419.3 |
| 4,136,827 | 1/1979 | Mushenko et al. | 239/419.3 |
| 4,363,443 | 12/1982 | Huehne | 239/419.3 X |
| 4,375,954 | 3/1983 | Trudel | 239/427.5 X |
| 4,784,321 | 11/1988 | Delaplace | 239/419.3 X |
| 4,821,963 | 4/1989 | Arnout et al. | 239/419.3 |

FOREIGN PATENT DOCUMENTS

| | | |
|---|---|---|
| 0102907 | 3/1984 | European Pat. Off. . |
| 0458018 | 11/1991 | European Pat. Off. . |
| 1241211 | 4/1968 | United Kingdom . |

*Primary Examiner*—Andres Kashinkow
*Attorney, Agent, or Firm*—Staas & Halsey

[57] ABSTRACT

An injector tip for burning aggregates for the mixing of fuel constituents, particularly fuel gases, auxiliary combustion gases and possibly liquid fuels is suggested which comprises feed ducts for the individual fuel constituents. The feed ducts of the individual fuel constituents are each preferably formed by a group of axial bores arranged on a circle, in which case the groups of axial bores assigned to the individual fuel constituents are arranged on concentric circles. According to the invention, the first feed ducts assigned to a first fuel constituent lead into first injector nozzle bores having a reduced cross section which in turn lead into a first radial injector gap. For the mixing of the first fuel constituent with at least a second fuel constituent, the second feed ducts assigned to the second fuel constituent must also lead into the first radial injector gap. Feed ducts are provided for at least one other fuel constituent by means of which an interior and/or exterior mixing of the first, second and at least third fuel constituent is implemented.

22 Claims, 12 Drawing Sheets

INJECTOR TIP FOR BURNING AGGREGATES

BACKGROUND OF THE INVENTION

1. Field of the Invention

The present invention relates to fuel mixing tips. More particularly, the invention relates to an injector tip for burning aggregates for the mixing of fuel constituents, particularly fuel gases, auxiliary combustion gases and possibly liquid fuels.

2. Description of Related Art

Within the whole range of autogenous techniques and the special fields of the cutting, preheating, flaming and welding iron-based and non-iron-based materials, as well as in the field of thermal spraying, flame spraying of wire-shaped and powder-shaped spraying filler materials, and of high-speed flame spraying, special mixtures of gaseous and/or liquid fuels with auxiliary combustion gases are required. These special mixtures are needed in order to implement specific flame temperatures, ignition and combustion speeds, flame pressures and flame speeds, by means of which and according to the application thereof the best possible results can be obtained.

In autogenous techniques, acetylene is predominantly used as the fuel gas, in combination with oxygen as an auxiliary combustion gas, for the welding and cutting of iron-based materials. For the flaming, preheating, soft and hard soldering as well as leveling of constituents made of steel, propane gas is also used as a fuel gas in combination with air or oxygen as the auxiliary combustion gas.

It is also known to use ethene, acetylene or propylene as fuel gases in combination with oxygen as the auxiliary combustion gas. The selection of the fuel gas depends essentially on the desired operating parameters.

The use of gaseous fuels presents many different problems. Acetylene, for example, is very reactive as an unsaturated carburetted hydrogen gas. Since there is the risk of decomposition of acetylene, acetylene can be removed from individual bottles only at a maximum removal pressure of 1.5 bar. The risk of an accident is increased because of the fact that the use of the above-listed gaseous fuels is relatively cost-intensive. In addition, by means of these fuels, the flaming characteristics required for special processes cannot be generated in a variable manner; as, for example, higher flame temperatures, higher flame speeds, higher or lower ignition speeds, higher or lower combustion speeds, higher primary flame is and higher flame pressures.

SUMMARY OF THE INVENTION

The present invention is therefore based on the object of indicating an injector tip for burning aggregates which is suitable for operating pertinent consuming devices, as, for example, cutting torches, preheating and flame torches, spraying devices for the thermal spraying of wire-shaped and powder-shaped spraying filler materials and for HVOF (high velocity oxygen fuel) spraying. In this case, it should be possible for the individual users to mix fuel gases with auxiliary combustion gases, such as oxygen and air and, if necessary, liquid fuel directly as a function of the desired physical characteristics.

The injector tip according to the invention achieves the above-mentioned object by the characteristics of the following disclosure. The initially mentioned injector tip for burning aggregates is constructed such that, for the mixing of at least two fuel constituents, the first feed ducts assigned to a first fuel constituent lead into first injector nozzle bores having a reduced cross section, which in turn lead into a first radial injector gap. The second feed ducts assigned to the second fuel constituent also lead into the first radial injector gap. At least for another third fuel constituent, feed ducts are provided by means of which an interior mixing and/or exterior mixing of the first, second and at least third fuel constituent is implemented.

According to the invention, it was recognized that the variable adjusting of the operating parameters of burning aggregates, when more than two fuel constituents are used and particularly when more than one fuel gas is used, is possible within relatively wide limits. According to the invention, it has also been recognized that the mixing operation should take place as close as possible to the face of a nozzle; for example, when the combustion chamber is connected behind it in order to avoid arc-backs or a flashback of the flame. It was also recognized that, when several fuel constituents are used, particularly several fuel gases in combination with liquid fuels, optimal flame conditions are achieved not only by means of an interior mixing but also by means of an exterior admixing of certain fuel constituents, such as liquid fuels. It was finally recognized that the mixing of several fuel constituents may take place within an injector tip if feed ducts are provided for at least one additional third fuel constituent. By means of the geometric design and arrangement of the feed ducts with respect to the feed ducts of the other fuel constituents, according to the invention, an interior mixing and/or exterior mixing of the fuel constituents can now be implemented.

There are several possibilities of developing and further developing an injector tip according to the invention, for the purposes of which reference is made herein.

In the case of an advantageous development of the injector tip according to the invention, the first feed ducts continue by way of the first injector nozzle bores and the first radial injector gap in the first injector mixing nozzle bores which lead into a second radial injector gap. The third feed ducts assigned to the third fuel constituent are to lead into the second radial injector gap and in this manner form as it were a double injector tip. This is particularly suitable for preheating torches, flame torches, cutting torches, wire and powder flame spraying devices, such as high-speed flame spraying devices. These consuming devices are designed in such a manner that the respective operating gases, after a radial axial pressure compensation in the respective pressure compensation chambers by way of a plurality of axial bores which are arranged on different partial circles, are fed to the double injector tip in an unmixed condition. This fuel constituent mixing technique is very simple and cost-effective and insures the highest possible safety during its handling.

In the case of a further advantageous variant of the injector tip, the third feed ducts assigned to the third fuel constituent lead into the first radial injector gap. This variant can be used in a particularly advantageous manner during HVOF spraying of low melting spraying materials, such as Al, Zn, Cu-materials and other materials. For example, nitrogen may be fed as the third fuel constituent by way of the first radial injector gap, whereby the protection against flashbacks of the device increased. For example, a flame occurring in the mixing area of the fuel gas—auxiliary combustion gas mixture can be extinguished by the addition of nitrogen in the radial injector gap. In addition, the flame temperature, the ignition and combustion speed as well as the primary flame output of the ignited fuel gas—auxiliary combustion gas mixture can be manipulated arbitrarily.

It is particularly advantageous when the first feed ducts continue by way of the first and possibly second radial injector gap in the first mixing bores. For the undisturbed operation of the injector tip of the invention, it is important that the feed ducts are aligned precisely and centrically with respect to the corresponding mixing bores so that turbulences in the flow of the fuel constituents are avoided.

There are now several developments of the injector tip according to the invention in which the third feed ducts assigned to the third fuel constituent lead into third injector nozzle bores having a reduced cross-section. In the case of one variant, these third injector nozzle bores also lead into the first radial injector gap.

This variant also represents a double injector tip, in which case, however, there are two separate injector mixing systems. Thus, two separate fuel constituent mixtures are produced in the interior of the injector tip which will then not mix before they emerge from the tip. The mixing operation of the fuel constituents therefore consists of an interior mixing of two fuel constituents respectively which is followed by an exterior mixing. So that both injector systems fed by the same radial injector gap work perfectly, it is advantageous the first and the third feed ducts to be offset with respect to one another on the respective circles. This double injector tip is particularly suitable for preheating and flame torches, for powder flame spraying of high-melting spraying additives, for high-speed flame spraying systems and also for high speed flaming with a high flame pressure for the production of synthetic diamond layers on substrates.

In the case of a further development of the above-described double injector tip, the first feed ducts, by way of the first injector nozzle bores and the first radial injector gap, continue in first injector mixing nozzle bores and lead into a second radial injector gap. The third feed ducts also continue by way of third injector nozzle bores and the first radial injector gap in third injector mixing nozzle bores which are independent of the first injector mixing nozzle bores and lead into the second radial injector gap. Finally by way of fourth feed ducts, a fourth fuel constituent is fed to this second radial injector gap. By means of this injector tip, two independent mixtures of three fuel constituents can be produced by way of the interior mixing, which fuel constituents will then be mixed by means of the exterior mixing.

Applications of this embodiment are in the field of special applications of high-speed flame technology for the production of the specific combustion and flame characteristics.

The injector tip according to the invention may also be designed such that it can be operated by means of liquid fuels or that liquid fuels form at least one fuel constituent. In a particularly advantageous development of such an injector tip, the third injector nozzle bores lead into third injector mixing bores having an enlarged cross section. In addition, the fourth feed ducts which are assigned to a fourth, preferably liquid fuel constituent also lead into these injector mixing bores. The liquid fuel is injected into the third injector mixing bores, is preferably mixed with an auxiliary combustion gas and emerges from the injector tip in an atomized state. This arrangement is particularly suitable for flame torches, cutting torches, HVOF flame spraying systems for the spraying of wire-shaped and powder-shaped spraying additives for special torches with high flame temperatures, flame speeds and flame pressures for the production of, for example, synthetic diamond layers on substrates.

For the high-speed flame spraying of wire-shaped or powder-shaped spraying additives, for the high-speed flame burning for the production of extremely high flame energies, flame speeds, flame pressures and flame temperatures while using hydrocarbon gases and liquid fuels on a hydrocarbon base with auxiliary combustion gases for the production of synthetic diamond layers on substrates, injector tips are particularly suitable whose third injector nozzle bores lead into a second radial injector gap, into which fourth feed ducts also lead which are assigned to a fourth fuel constituent.

In the case of injector tips which implement an exterior mixing of the fuel constituents, the first injector nozzle bores or injector mixing nozzle bores continue in the first mixing bores. The third injector nozzle bores or injector mixing nozzle bores also continue in the third mixing bores which are independent of the first mixing bores.

The admixing of liquid fuel may also take place in a simple manner by way of third or additional feed ducts which are constructed as atomizer nozzle bores for liquid fuels. According to the application, these atomizer nozzle bores may be constructed axially and/or focusing with respect to the axis of the injector tip.

In addition, it is often advantageous to lead at least one further fuel constituent by way of additional feed ducts independently of the first, second and third fuel constituents to the face of the injector tip, where an exterior mixing may then take place with the other fuel constituents. The additional feed ducts which are assigned to at least one additional fuel constituent may lead, for example, into an annular gap starting from which outlet bores extend to the face of the injector tip. A mixture of several additional fuel constituents can then also take place in the annular gap.

Finally, it should be pointed out that the mixing bores as well as the outlet bores of the injector tip may be oriented on the face side to be axial/or focusing. The above-described developments of the injector tip according to the invention may be provided with a central bore. In an advantageous development, this central bore may also lead into a central injector gap into which the feed ducts also lead which are assigned to a fuel constituent so that a mixing of the fuel constituent guided in the central bore with the fuel constituent guided in the feed ducts can be implemented.

Different possibilities exist to develop and further develop the teaching of the present invention in an advantageous manner. For this purpose, reference is made to the claims, on the one hand, and, on the other hand, to the following explanation of embodiments of the invention taken with respect to the drawings.

BRIEF DESCRIPTIONS OF THE DRAWINGS

FIG. 1a is a sectional view of an injector tip according to the invention. FIG. 1b is a top view of the face of the injector tip illustrated in FIG. 1a. FIG. 1c is a sectional view of the injector tip illustrated in FIG. 1a with a combustion chamber and an expansion nozzle connected behind it.

FIG. 2b is a top view of the face of the injector tip of FIG. 2a.

FIG. 3b is a top view of the face of the injector tip of FIG. 3a.

FIG. 4b is a top view of the face of the injector tip of FIG. 4a.

Figure 5A:
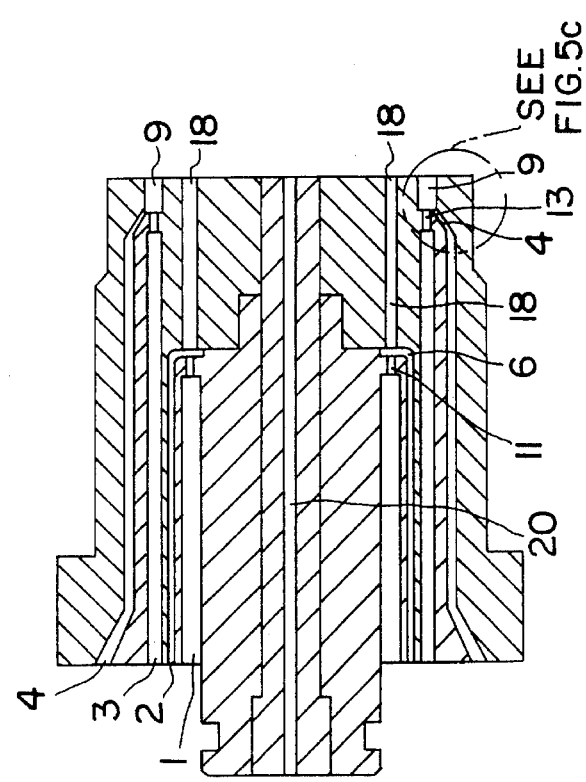
Figure 5B:
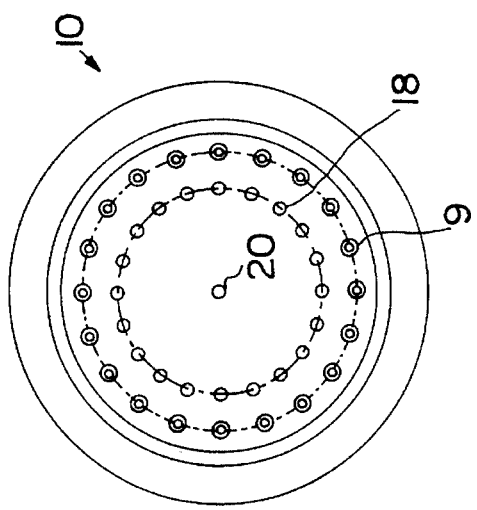
Figure 5C:
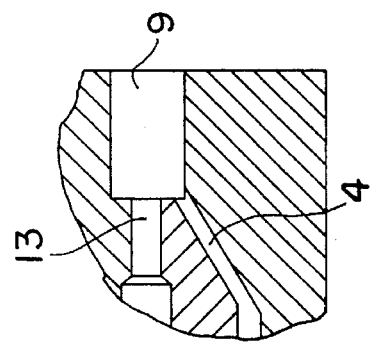

FIG. 5a is a sectional view of an embodiment of an injector tip according to the invention. FIG. 5b is a top view of the face of the injector tip of FIG. 5a. FIG. 5c is an enlargement of a detail illustrated in FIG. 5a of the injector tip.

Figure 6A:
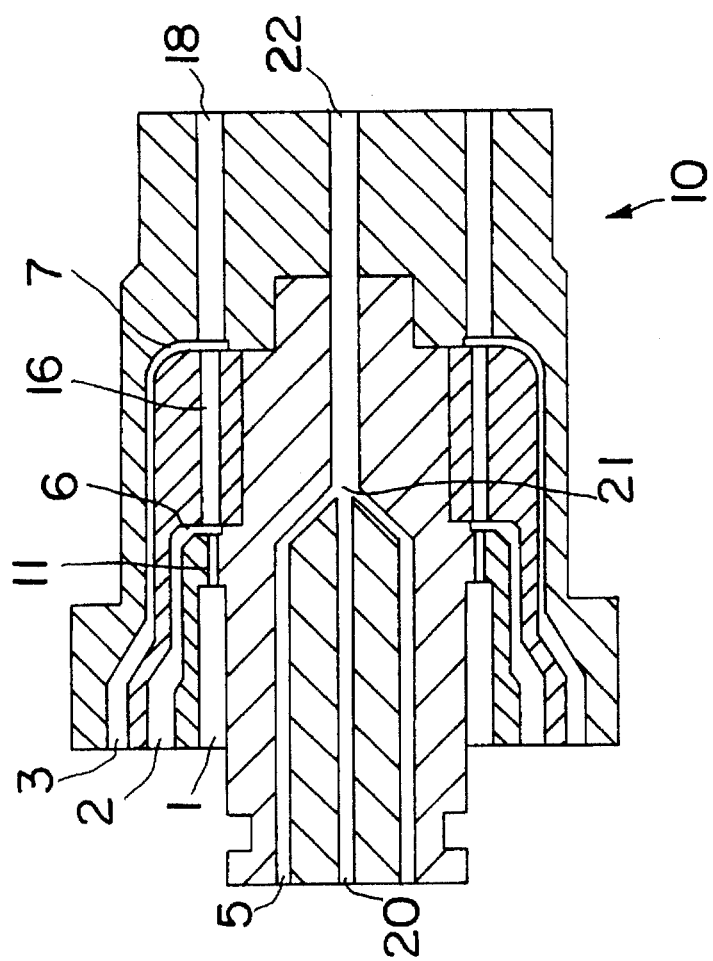
Figure 6B:
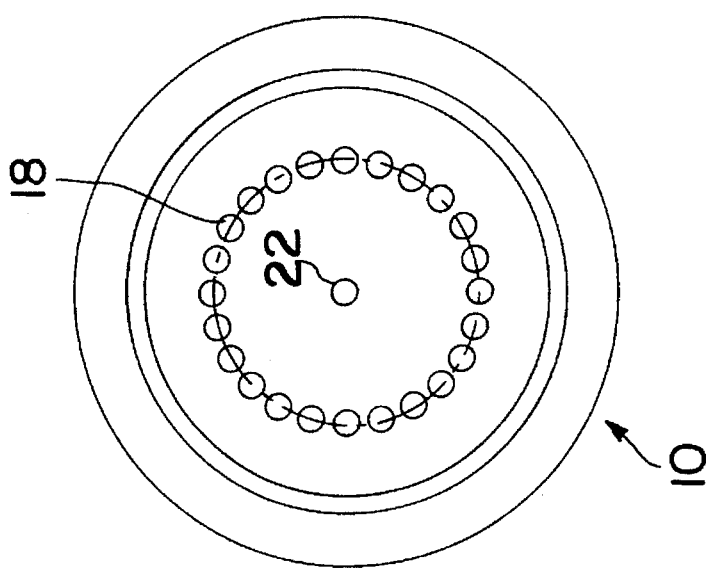

FIG. 6a is a sectional view of an embodiment of an injector tip according to the invention. FIG. 6b is a top view of the face of the injector tip of FIG. 6a.

Figure 7A:
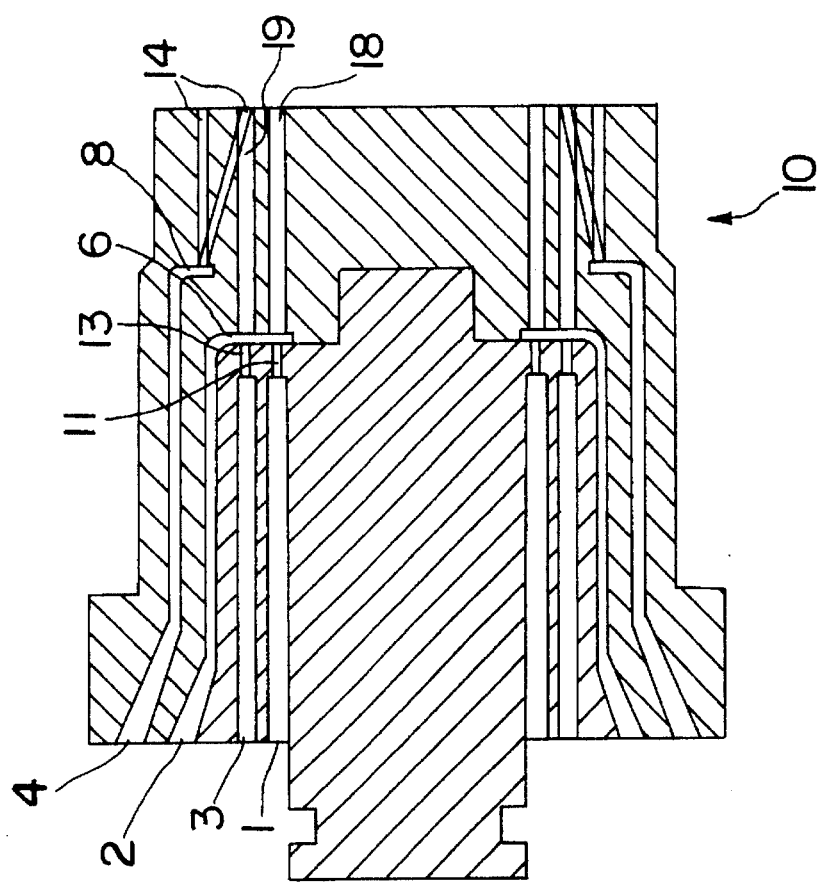
Figure 7B:
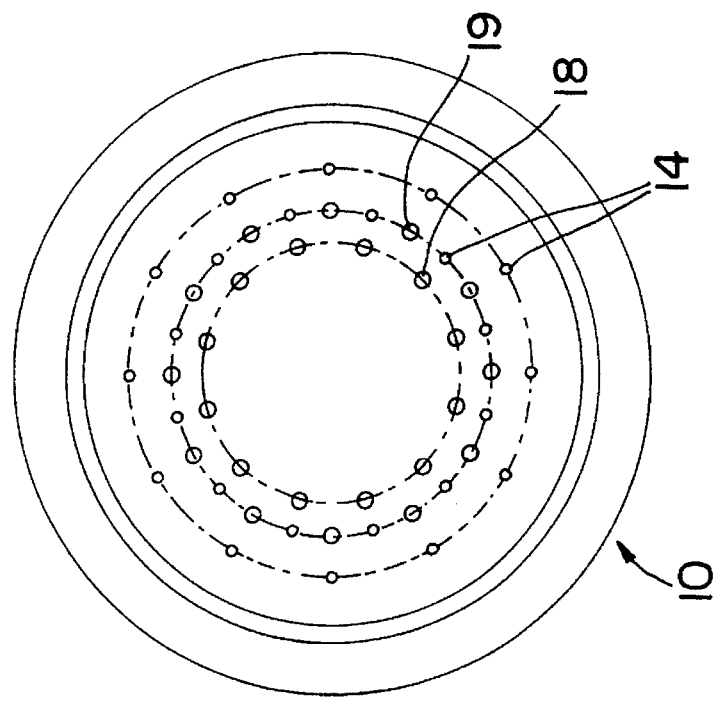

FIG. 7a is a sectional view of an embodiment of an injector tip according to the invention. FIG. 7b is a top view of the face of the injector tip of FIG. 7a.

Figure 8A:
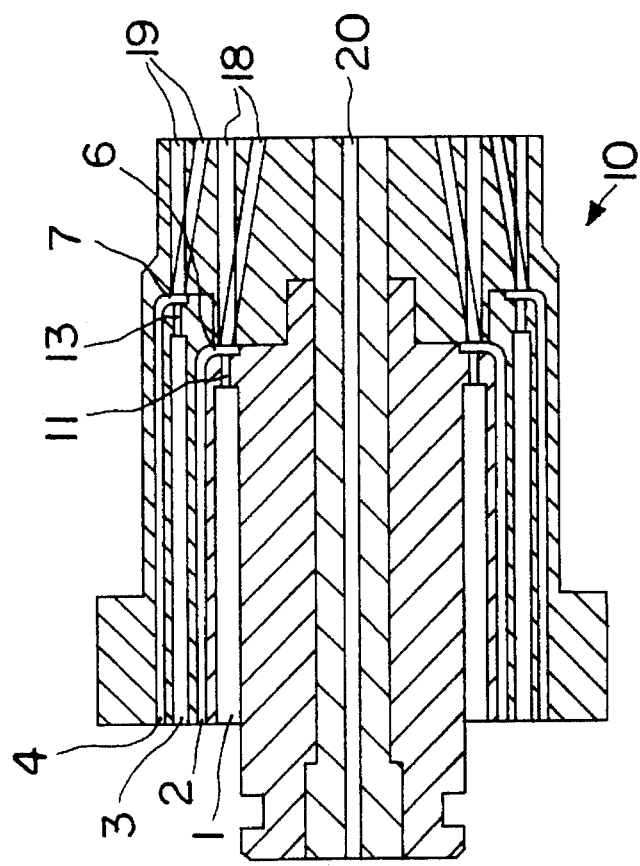
Figure 8B:
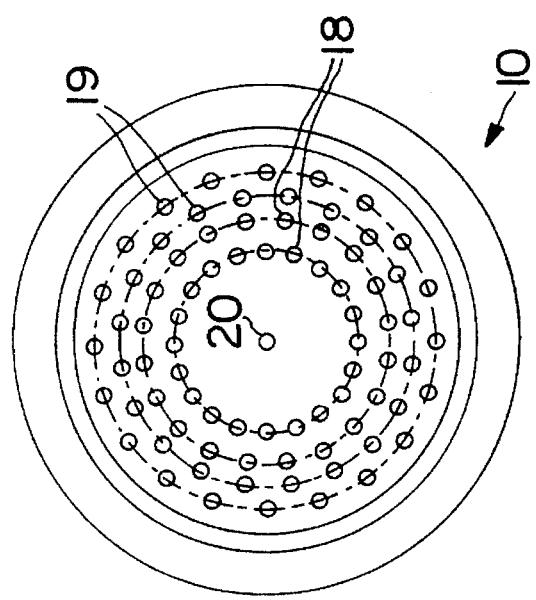

FIG. 8a is a sectional view of an embodiment of an injector tip according to the invention. FIG. 8b is a top view of the face of the injector tip of FIG. 8a.

Figure 9A:
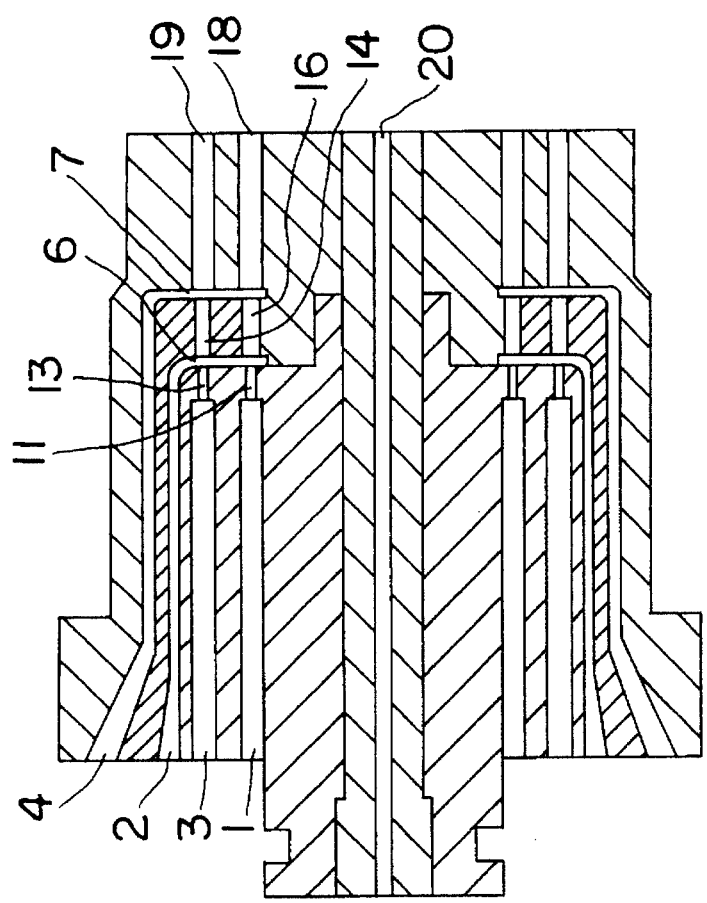
Figure 9B:
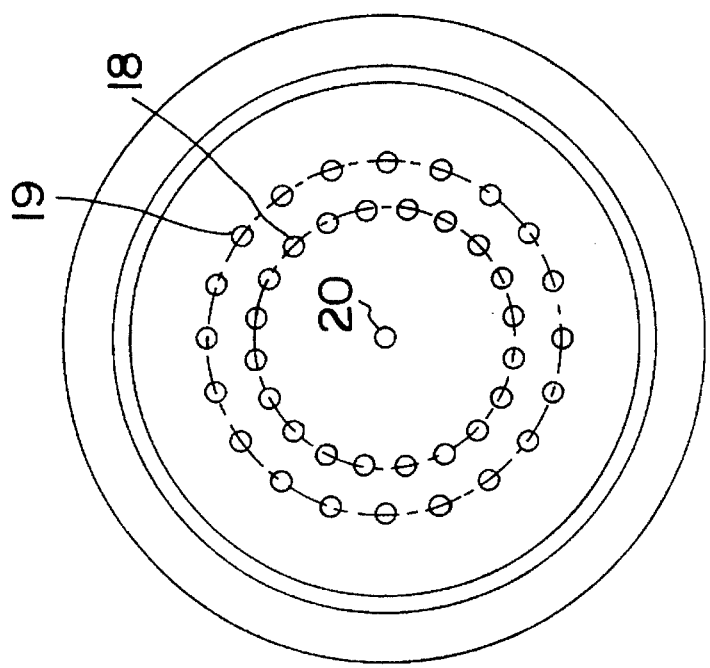

FIG. 9a is a sectional view of an embodiment of an injector tip according to the invention. FIG. 9b is a top view of the face of the injector tip of FIG. 9a.

Figure 10A:
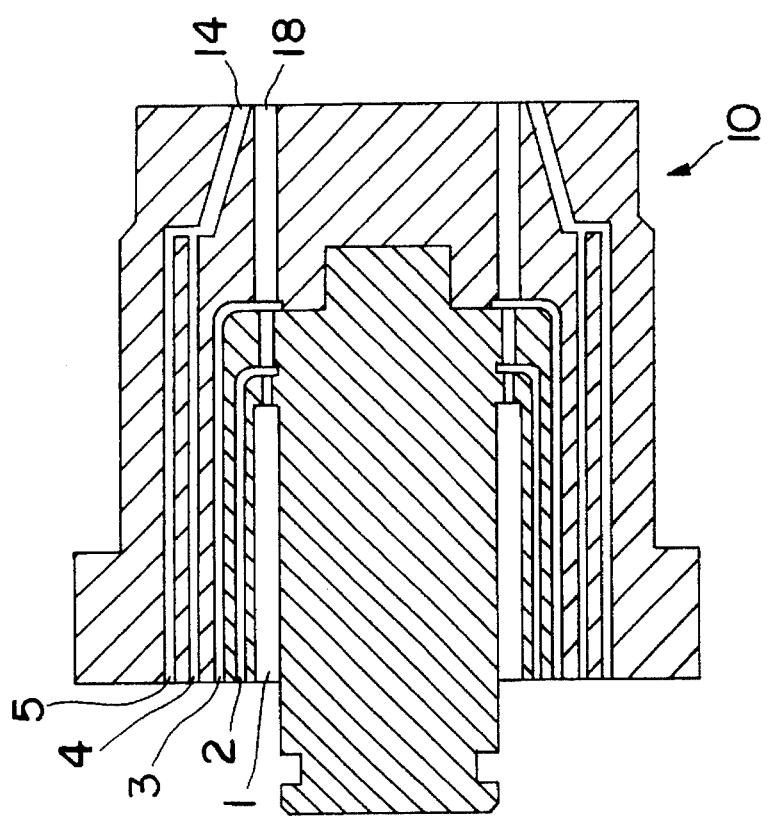
Figure 10B:
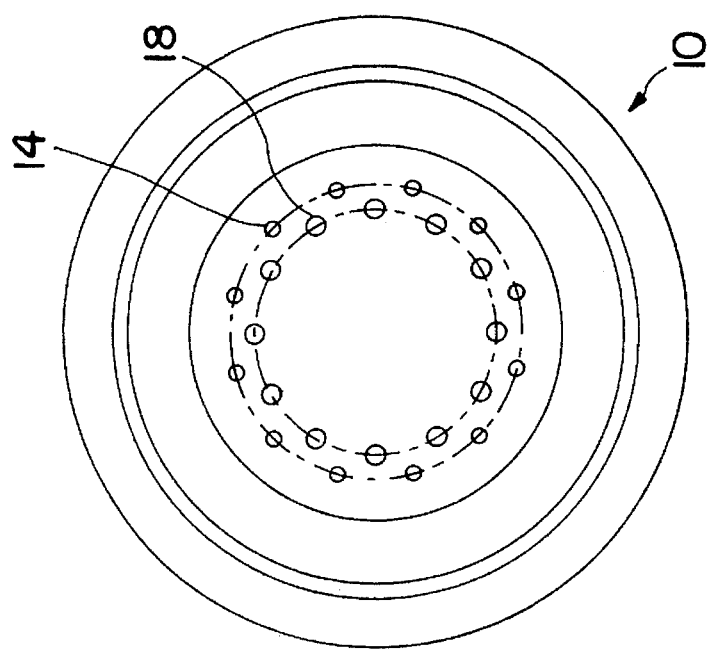

FIG. 10a is a sectional view of an embodiment of an injector tip according to the invention. FIG. 10b is a top view of the face of the injector tip according to FIG. 10a.

Figure 11A:
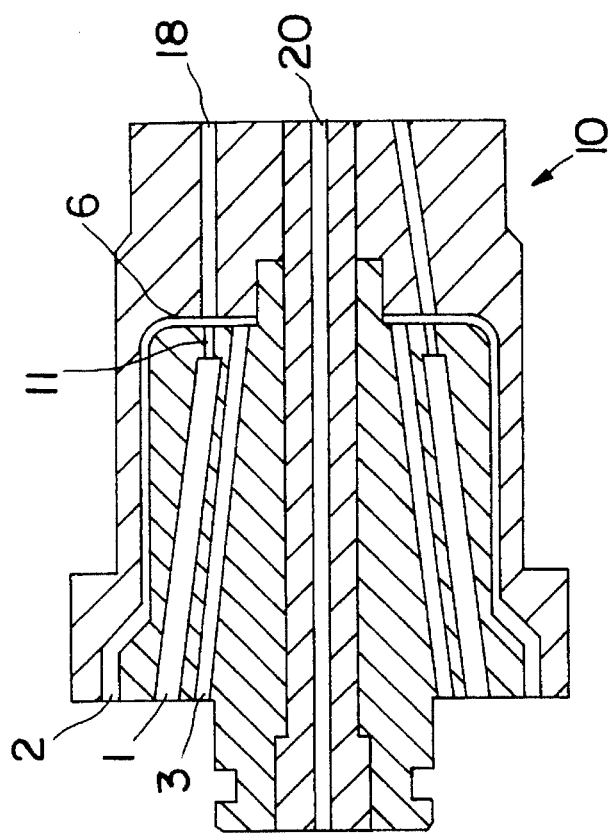
Figure 11B:
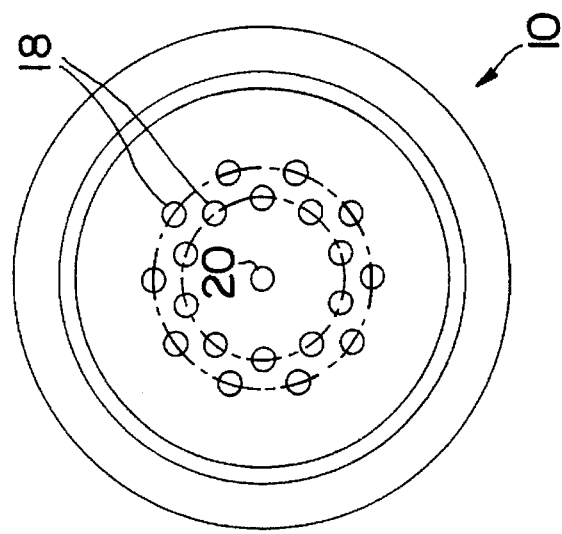

FIG. 11a is a sectional view of an embodiment of an injector tip according to the invention. FIG. 11b is a top view of the face the injector tip of FIG. 11a.

Figure 1A:
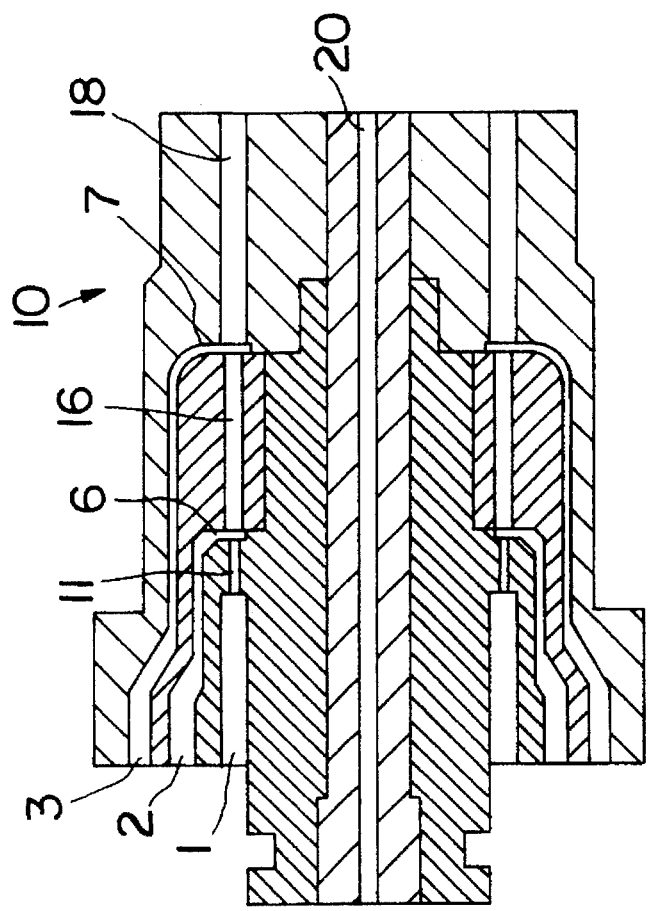

FIG. 1a is a sectional view of an injector tip 10 according to the invention for burning aggregates for the mixing of fuel constituents, particularly fuel gases, auxiliary combustion gases and possibly liquid fuels. Feed ducts 1, 2, 3 were used for the individual fuel. The feed ducts 1, 2, 3 of the individual fuel constituents are preferably constructed by a respective group of axial bores arranged on a circle. The groups of axial bores are assigned to the individual fuel constituents being arranged on concentric circles.

For the mixing of at least two fuel constituents, according to the invention, the first feed ducts 1 are assigned to a first fuel constituent, which leads into first injector nozzle bores 11, having a reduced cross section, which in turn lead into a first radial injector gap 6. The second feed ducts 2 assigned to the second fuel constituent also lead into the first radial injector gap 6. In addition, according to the invention, third feed ducts are provided for at least one other third fuel constituent, by means of which, in the embodiment illustrated in FIG. 1, an interior mixing is implemented of the first, second and third fuel constituents.

By way of the first injector nozzle bores 11 and the first radial injector gap 6, the first feed ducts 1 continue in first injector mixing nozzle bores 16 which lead into a second radial injector gap 7. The third feed ducts 3 assigned to the third fuel constituent also lead into the second radial injector gap 7. By way of the first injector nozzle bores 11, the first radial injector gap 6, the first injector mixing nozzle bores 16, as well as the second radial injector gap 7, the first feed ducts 1 continue in first mixing bores 18 which lead into the face of the injector tip 10.

The injector tip 10 illustrated in FIG. 1 finally also has a central bore 20.

Figure 1B:
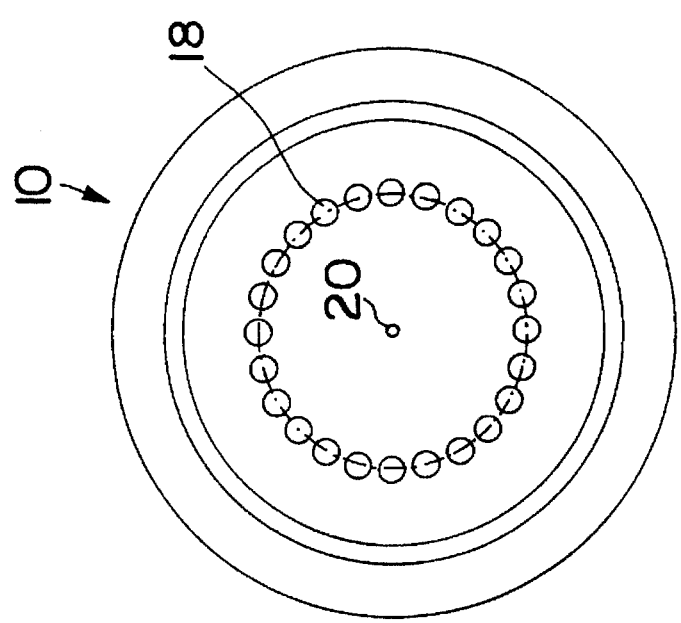

FIG. 1b, which represents a top view of the face of the injector tip 10, shows that the mixing bores 18 and therefore also the injector mixing nozzle bores 16 and the injector nozzle bores 11 are arranged on a circle around the central bore 20.

Figure 1C:
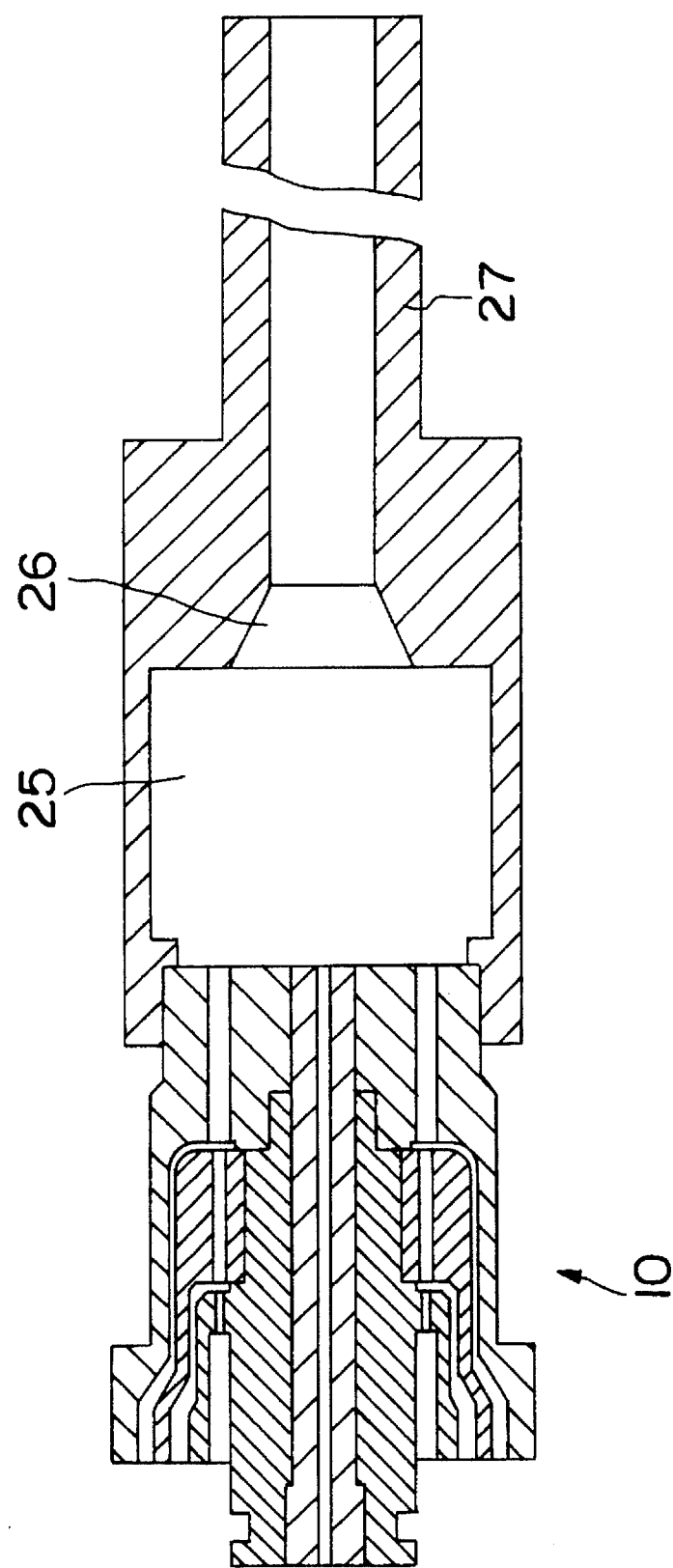

Customarily, a combustion chamber 25 is connected behind the injector tip 10, which combustion chamber 25, by way of a transition cone 26, changes into an expansion nozzle 27. This is illustrated in FIG. 1c.

The above described injector tip represents a gas mixing double injector tip for preheating torches, flame torches, cutting torches, wire and powder flame spraying devices and, for example, high speed flame spraying devices.

These consuming devices are designed in such a manner that the respective operating gases, a radial-axial pressure compensation in the respective pressure compensation chambers, by way of a plurality of axial bores which are arranged on different partial circles, are fed to the double injector tip in an unmixed condition, as shown schematically in FIG. 1. In central bore 20, according to their use, cutting oxygen, powder transport gases with powder or other operating constituents are fed and emerge from the face of the injector tip in the center. By way of the plurality of the feed ducts on the inner partial circle, oxygen arrives in the injector nozzle bores 11 and flows at supersonic speed through the first radial injector gap 6 (primary fuel gas) which by way of the feed ducts on the center partial circle is fed with primary heating gas, such as hydrogen or propane gas. Because of the high flow rate of the oxygen currents flowing out of the injector nozzle bores 11 which flow into the respective opposite injector mixing nozzle bores 16, a vacuum is created in the first radial injector gap 6 filled with primary gas, which vacuum takes in the primary fuel gas and pulls it along into the injector mixing nozzle bores 16.

The resulting fuel gas—oxygen mixture as such also flows at a very high speed through the second radial injector gap 7 which is filled with a secondary gas, such as acetylene, and sucks the secondary fuel gas into the mixing bores 18. The flammable gas mixture emerges from the mixing bores 18 arranged, on the face side radially concentrically around the central bore 20.

By way of the plurality of feed ducts 3, the secondary fuel gas arrives in the second radial injector gap 7.

The above-described gas mixing technique is very simple and cost effective and insures the highest possible safety during handling. During the mixing of the primary fuel gas—hydrogen—with the secondary fuel gas—acetylene—and the auxiliary combustion gas—oxygen—, a fuel gas oxygen mixture is obtained which has a very high specific heating value and other special positive characteristics.

Figure 2A:
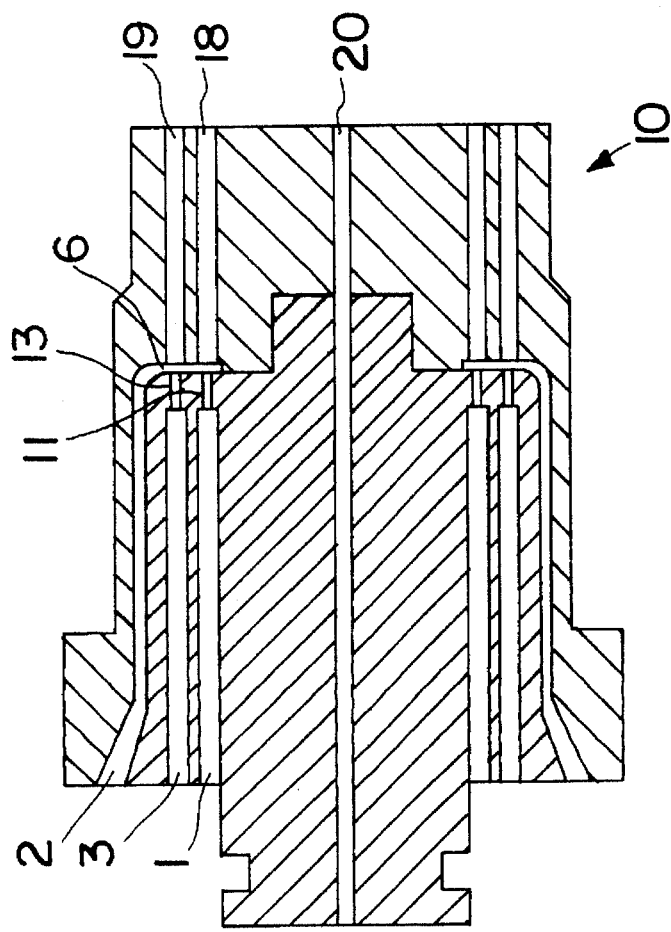
FIG. 2a is a sectional view of an embodiment of an injector tip according to the invention.

FIGS. 2a and b illustrate an injector tip 10, which like the injector tip shown in FIG. 1, having a central bore 20 and whose first feed ducts 1 by way of first injector nozzle bores 11 lead into a first radial injector gap 1 in order to continue in a first mixing bore 18 to the face of the injector tip 10.

In contrast to the embodiment illustrated in FIG. 1, in this case, the third feed ducts assigned to the third fuel constituent lead into third injector nozzle bores 13 having a reduced cross section. These third injector nozzle bores 13 also lead into the first radial injector gap 6. The top view of the face of the injector tip 10 illustrated in FIG. 2a shows that the first and the third feed ducts 1 and 3 as well as their extensions are arranged to be offset with respect to one another on the respective circles.

Figure 2B:
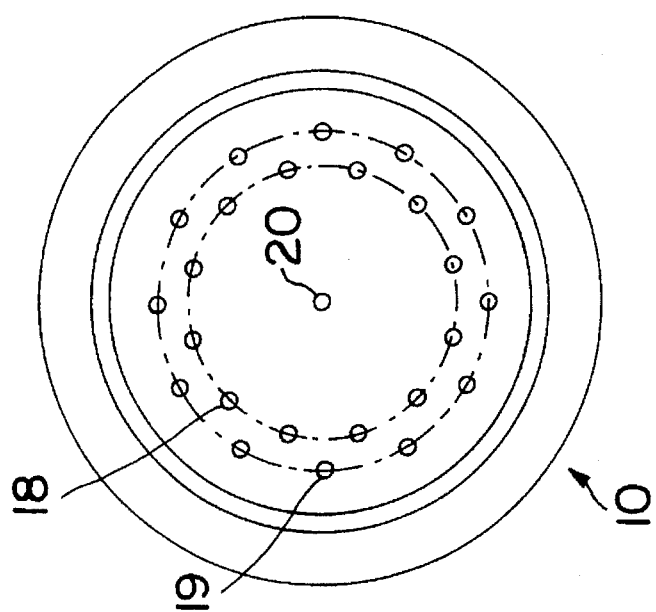

The injector tip illustrated in FIG. 2 also is a double injector tip for preheating and flame torches, for the powder flame spraying of high melting spraying additives, for high-speed flame spraying systems, for high-speed flaming at a high flame pressure for the production of synthetic diamond layers on substrates and other special uses.

The individual operating gases are also fed in an unmixed condition to this double injector tip by way of radial—axial pressure compensation chambers. This has the advantage that the individual gas flows, arranged about different partial circles concentrically around the central bore, when entering into the respective assigned injector mixing system, have the same pressure, speed and quantity, which after the mixing and the ignition of the gas mixture, results in a symmetrical flame picture and an optimal combustion.

Through the central bore 20, according to their use, the operating constituents, such as powder transport gas with a powdery spraying additive, graphite or carbon dioxide are added. By way of the feed ducts 2 on the outermost partial circle, the fuel gas—acetylene—, for example, is fed which fills the first radial injector gap 6. Through the feed ducts 1 arranged on the innermost partial circle, a second fuel gas, such as hydrogen, is fed at a high inflow pressure and is accelerated to sonic speed in the first injector nozzle bores 11. The plurality of high-speed hydrogen currents flow through the first radial injector gap filled with acetylene and into the respective opposite mixing bores 18, in which case they pull along the acetylene. A vacuum is created in the first radial injector gap 6 so that additional acetylene is virtually sucked in.

The fuel gas—fuel gas mixture is formed in the first mixing bores 18 and emerges from the face of the injector tip 10 concentrically around the central bore 20.

By way of the feed ducts 3 arranged on the center partial circle, oxygen is pressed through the third injector nozzle bores 13 at a high pressure, so that the individual oxygen currents which flow from the third injector nozzle bores 13 into the first radial injector gap 6, flow through this injector gap at a sonic speed and enter into the opposite third mixing bores 19, pulling along the acetylene from the first radial injector gap 6. Because of the supersonic flow of the oxygen currents, an additional vacuum is formed in the first radial injector gap 6 so that acetylene is taken in in an increased manner. The mixed flammable acetylene—oxygen mixture flows out of the third mixing bores 19 which are arranged concentrically on the outer partial circle.

As mentioned above, the first mixing bores 18 for the fuel gas—fuel gas mixture are offset on the inner partial circle in each case by one bore with respect to the third mixing bores 19 of the fuel gas—oxygen mixture on the outer partial circle. As a result, it is insured that both injector systems, specifically the system for the fuel gas—fuel gas mixture and the system for the fuel gas—oxygen mixture, can operate in a perfect manner.

Figure 3A:
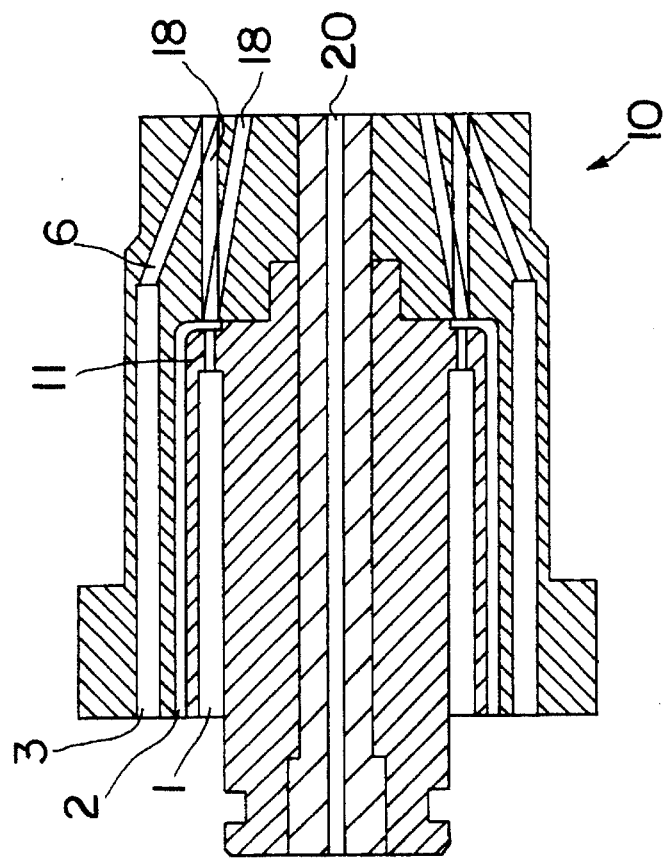
FIG. 3a is a sectional view of an embodiment of an injector tip according to the present invention.
Figure 3B:
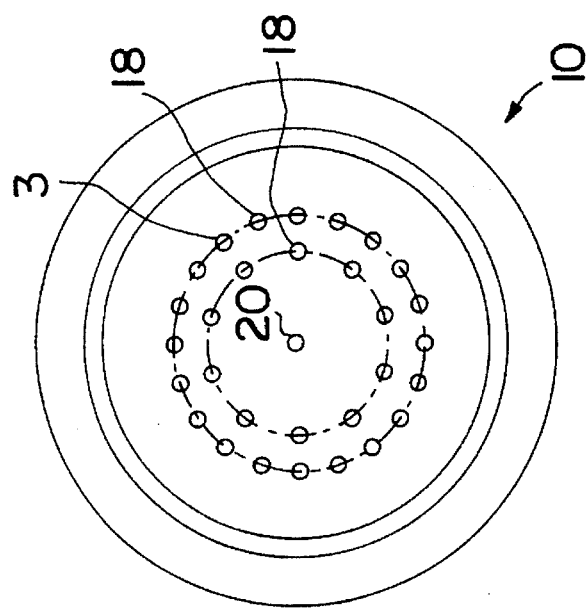

FIG. 3 shows an embodiment of an injector tip 10 which is also provided with a central bore 20 and has first feed ducts 1 which by way of first injector nozzle bores 11 lead into a first radial injector gap 6 and then continue in first mixing bores 18.

It should be noted here that the mixing bores 18 may be oriented axially as well as focusing with respect to the central bore 20 of the injector tip 10.

The third feed ducts 3, which are assigned to the third fuel constituent, are constructed as atomizer nozzle bores for liquid fuel and are oriented to be focusing with respect to the central bore 20. They extend directly to the face of the injector tip.

This injector tip 10 illustrated in FIG. 3 is particularly suitable for high-speed flame spraying systems for the spraying of powder-shaped and wire-shaped additives or for high speed torches for generating a high speed flame while using gaseous hydrocarbons and liquid hydrocarbon fuels for the production of synthetic diamond layers on substrates.

By means of the injector tip illustrated in FIG. 3, mixtures of gaseous and liquid fuels may therefore be produced with an auxiliary combustion gas, specifically by means of an exterior mixing.

According to their use, powder transport gas and powder, spray wire and/or carbon dioxide and other operating constituents are fed by way of the central bore 20. The fuel gas—oxygen mixing according to the injector principle takes place by way of the oxygen feed ducts 1, the first radial injector gap 6 into which the respective fuel gases are fed by way of the feed ducts 2, and the first mixing bores 18 which are arranged to be axial and or focusing.

By way of the feed ducts 3 of the outer partial circle, liquid fuel, such as gasoline or other fuels, are guided at a high pressure to the face of the injector tip 10. After the igniting of the fuel gas—oxygen mixture, which flows out of a plurality of first mixing bores 18 arranged concentrically around the central bore 20, liquid fuel is pressed through the feed ducts 3 constructed as atomizer nozzle bores so the atomized liquid fuel ignites at the pilot flame.

The ignition and combustion operation, for producing a high speed flame, takes place at an extremely high flame energy and flame pressure in a combustion chamber 25 which is connected directly behind the injector tip and may be water-cooled and has an adjoining expansion nozzle 27.

The embodiment of an injector tip 10 illustrated in FIG. 4 again differs from the above-described embodiments by the design and construction of the third feed ducts 3. These third feed ducts 3 assigned to the third fuel constituent lead into third injector nozzle bores 13 having a reduced cross section. These third injector nozzle bores 13 lead into a second radial injector gap 7. The fourth feed ducts 4 assigned to a fourth fuel constituent also lead into the second radial injector gap 7. The first injector nozzle bores 11 continue in first mixing bores 18; as well as the third injector nozzle bores 13 which continue in third mixing bores 19 which are independent of the first mixing bores 18.

This injector tip is also a double injector tip in which case there are two completely separate injector systems. This double injector tip is particularly suitable for high speed flame spraying of wire-shaped or powder-shaped spraying additives, for high-speed flame torches for generating extremely high flame energies, flame speeds, flame pressure and flame temperatures while using hydrocarbon gases and liquid fuels on a hydrocarbon base with auxiliary combustion gases, such as oxygen for the production of synthetic diamond layers on substrates.

FIG. 5 illustrates an embodiment of an injector tip 10 in which the third feed ducts 3 assigned to the third fuel constituent lead into third injector nozzle bores 13 having a reduced cross section. These third injector nozzle bores 13 in turn lead into third injector mixing bores 9 having an enlarged cross section. The fourth feed ducts 4 assigned to a fourth fuel constituent also lead into these third injector mixing bores 9 which are constructed directly on the face of the injector tip 10.

This is an injector tip for the mixing of fuel gases with auxiliary combustion gases and liquid fuels for the forming of specific mixtures in arbitrary compositions. Applications for such injector tips are flame torches, cutting torches, HVOF—flame spraying systems for the spraying of wire-shaped and powder-shaped spraying additives, production of special torches with a high flame temperature, flame speed and flame pressures for producing, for example, synthetic diamond layers on substrates.

By way of the central bore 20, any operating constituents, such as spraying powders, powder transport gas, wire shaped spraying additives or similar substances may be fed. An auxiliary combustion gas, such as oxygen, is fed by way of the feed ducts 1 arranged on the inner partial circle to the first injector nozzle bores 11 at a high pressure and is accelerated to sonic speed. As required, nitrogen, for example, may be added to the auxiliary combustion gas in order to be able to manipulate the ignition and combustion speeds of the produced mixture. By way of the second feed ducts 2 arranged on the second inner partial circle, fuel gases, such as hydrogen, acetylene, propylene or propane gas are fed at low pressures and arrive in the first radial injector gap 6. The highly accelerated oxygen which flows out of the injector nozzle bores 11 flows through the first radial injector gap 6, in which case the fuel gas is pulled along into the respective opposite first mixing bores 18. An oxygen fuel gas mixture will then emerge on the face of the injector tip 10. During the ignition, a pilot flame ring is generated which is arranged concentrically around the center bore 20. By means of a plurality of feed ducts 3, which are arranged on a third partial circle, a second auxiliary combustion gas, such as oxygen or an air mixture, which is to supply the main flames in combination with liquid fuel, is fed at a high pressure. In the third injector nozzle bores 13, the individual flows of the second auxiliary combustion gas are accelerated to sonic speed and flow into the connected expanded injector mixing bores 9.

Fourth feed ducts 4 for a liquid fuel, such as gasoline, also lead into these expanded injector mixing bores 9. The liquid fuel is injected into the injector mixing bores 9, mixes there with the second auxiliary combustion gas, and emerges in an atomized condition at the face of the injector tip 10. The emerging mixture ignites on the interior pilot flame rings. The liquid fuel is fed to the fourth feed ducts 4 on the outer partial circle at a high pressure which is generated by a pump.

FIG. 5c is an enlarged representation of the constructive design of the mouth of a fourth feed duct 4 into an expanded injector mixing bore 9 on the face of injector tip 10.

FIG. 6 illustrates a development of an injector tip which is very similar to the injector tip shown in FIG. 1. The center bore 20 in this case leads into a central injector gap 21 to which, by way of feed ducts 5, at least one other fuel constituent is fed. The central bore 20 will then continue by way of the central injector gap 21 in a central mixing bore 22.

This is a triple injector tip for the mixing of different fuel gases with oxygen.

Through the central bore 20, an auxiliary combustion gas, such as oxygen, flows out, flows at a sonic speed through the central injector gap 21 and flows into the central mixing bore 22.

By way of the feed ducts 5, for example, hydrogen is fed to the central injector gap 21, through which the auxiliary combustion gas oxygen flows at sonic speed. The hydrogen is then pulled along into the central mixing bore 22. The hydrogen—oxygen mixture emerges at the face of the injector tip. By way of the first feed ducts 1, an auxiliary combustion gas, such as oxygen, is also fed which is accelerated in the first injector nozzle bores 11 to sonic speed and flows through the first radial injector gap 6 which is filled, for example, with propane gas, which by way of the second feed ducts 2, is fed at a low pressure. The highly accelerated oxygen flows, which emerge from the first injector nozzle bores 11, while they flow through the first radial injector gap 6, pull along propane gas into the first injector mixing nozzle bores 16 which are situated opposite the individual injector nozzle bores 11 in a precisely centered manner. The hydrogen—oxygen mixture, emerging from the first injector mixing nozzle bore 16, flows through the second radial injector gap 7 at sonic speed and pulls along acetylene from the second radial injector gap 7 filled with acetylene. This acetylene is fed to the second radial injector gap 7 by way of the third feed ducts 3. A hydrogen—acetylene—oxygen mixture will then emerge on the face of the injector tip 10. During the ignition, a high energy hydrogen—oxygen flame is generated in the center, which flame is concentrically surrounded by a plurality of individual flames which are fed from the hydrogen—acetylene—oxygen ignition mixture.

FIG. 7 shows an embodiment of an injector tip 10 which has no central bore. The first, second and third feed ducts 1, 2 and 3 are constructed as in the embodiment illustrated in FIG. 2. In addition, in this case fourth feed ducts are provided which are arranged on a fourth outer partial circle and which extend independently of the first, second and third fuel constituents to the face of the injector tip. These feed ducts 4 lead into an annular gap 8, starting from which outlet bores 14 extend to the face of the injector tip 10. These outlet bores 14 are oriented to be axial and/or focusing.

By means of the injector tip shown here, fuel gas—fuel gas injector mixing can be implemented by means of the exterior admixing of auxiliary combustion gases, such as oxygen or air. Such a system is used in high-speed flame spraying, for high-speed flame torches and for special torches which generate high flame pressures.

By way of the feed ducts 1 situated on the inner partial circle, hydrogen, for example, is fed at a high pressure and is accelerated to sonic speed in the first injector nozzle bores 11. The hydrogen currents emerging in a highly accelerated manner from the first injector nozzle bores 11 flow through the first radial injector gap 6 which is filled with acetylene and which at a maximal inflow pressure of 1.5 bar is fed by way of the feed ducts 2 situated on the center partial circle.

In this case, acetylene is pulled together with the hydrogen into the opposite first mixing bores 18, so that a hydrogen acetylene mixture emerges at the face of the injector tip 10.

By way of the third feed ducts 3 arranged on the second partial circle, propane gas, propylene or ethene as the injector pressure gas is fed at approximately 5.0 to 6.0 bar inflow pressure and is accelerated in the third injector nozzle bores 13 also to sonic speed. The first and third injector nozzle bores 11 and 13 are arranged to be offset by one bore respectively in order to insure a perfect taking-in of acetylene from the radial injector gap 6.

The highly accelerated gas flows emerging from the third injector nozzle bores 13 also pull acetylene from the first radial injector gap 6 into the third mixing bores 19, from which the fuel gas—fuel gas mixture emerges on the face of the injector tip 10.

By way of the feed ducts 4 arranged on the outer partial circle, an auxiliary combustion gas, such as oxygen or an oxygen—nitrogen mixture is fed and flows into the annular groove 8, from which it emerges by way of the outlet bores 14 on the face side in an axial and/or focussed manner.

The described mixing system is particularly suitable for the production of extremely high flame pressures when the fuel gas mixtures are burned by means of an auxiliary combustion gas in a water cooled combustion chamber which is connected behind it and has an expansion nozzle.

The fuel gas—fuel gas injector mixing system in this case is absolutely safe with respect to flash backs and arc-backs.

Figure 4A:
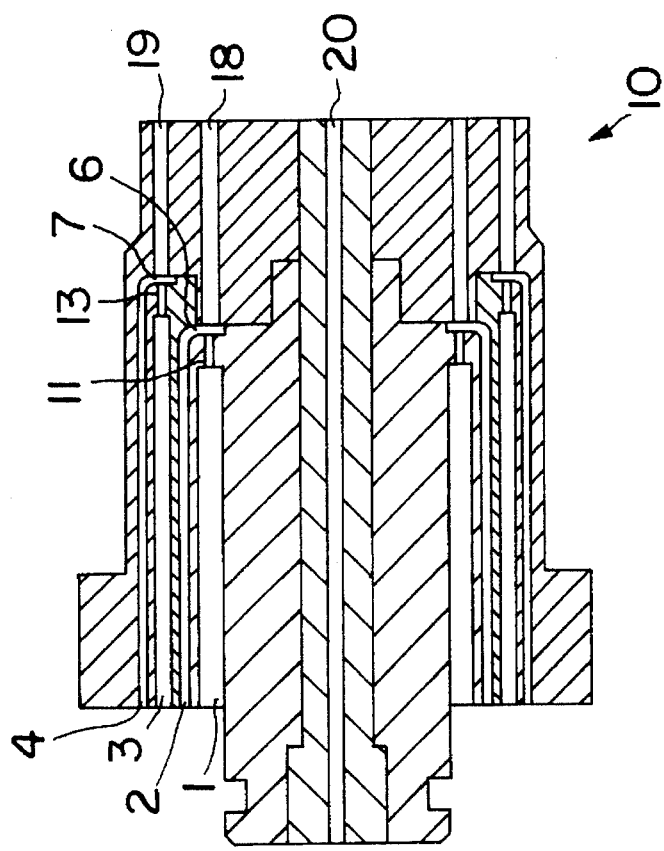
FIG. 4a is a sectional view of an embodiment of an injector tip according to the invention.
Figure 4B:
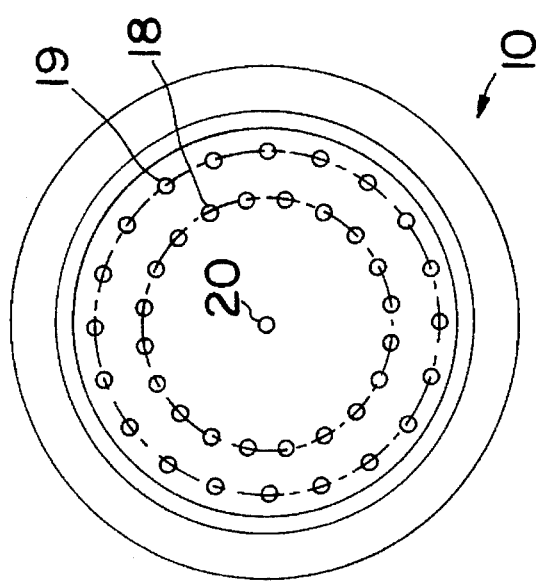

FIG. 8 illustrates an embodiment of an injector tip which corresponds largely to the embodiment illustrated in FIG. 4. Only the first and third mixing bores alternate in that they are oriented axially and/or focusing.

FIG. 8 therefore shows a double injector tip which is particularly suitable for generating a high-speed flame for special applications, such as the production of synthetic diamond layers on substrates, because the extension nozzle which is connected behind it can be operated with the combustion chamber by means of any frequency alternating between an acetylene—oxygen flame and a hydrogen—oxygen flame.

The injector tip has two separately operating injector gas mixing systems. Each of the two gas mixing systems has a plurality of individual injector gas mixing systems arranged concentrically around the central bore 20 and consisting in each case of the feed ducts 1 or 3, the injector nozzle bores 11 or 13, the radial injector gap 6 or 7, the feed ducts 2 or 4, and the mixing bores 18 or 19.

FIG. 9 shows a further development of the injector tip illustrated in FIG. 2, in which a fourth fuel constituent is fed by way of a second radial injector gap 7 to the gas mixtures produced by way of the two separate injector mixing systems.

For this purpose, by way of the first injector nozzle bores 11 and the first radial injector gap 6, the first feed ducts 1 continue in first injector mixing nozzle bores 16 which lead into the second radial injector gap 7. The third feed ducts 3 continue by way of the third injector nozzle bores 13 and the first radial injector gap 6 in third injector mixing nozzle bores 17 which then also lead into the second radial injector gap 7. A fourth fuel constituent is fed to this second radial injector gap 7 by way of fourth feed ducts 4. The first as well as the third injector mixing nozzle bores 16 and 17 continue in first and third mixing bores 18 and 19 which are independent of one another.

This injector tip 10 permits the interior mixing of three different fuel gases with an exterior admixing of an auxiliary combustion gas and/or an interior admixing of nitrogen into an auxiliary combustion gas, such as oxygen, which can now be admixed on the outside as any oxygen—nitrogen mixture for the control of the flame temperature, the ignition speed and the combustion speed.

FIG. 10 shows an embodiment of an injector tip 10 which corresponds essentially to the embodiment shown in FIG. 1, in which case, however, there is no central bore. However, fourth and fifth feed ducts 4 and 5 for auxiliary combustion gases are provided which lead into an annular gap 8, are mixed there and are then guided by way of outlet bores 14 independently of the other fuel constituents to the face of the injector tip 10.

The above-mentioned system is suitable for mixing three different fuel gases according to the double injector mixing system which was explained in conjunction with FIG. 1. The auxiliary combustion gas oxygen and/or an oxygen—nitrogen mixture is admixed on the face side outside the injector tip.

This injector tip may be utilized, for example, for special applications, for the generating of a high-energy, high-speed flame, in which case an auxiliary combustion gas is admixed to the fuel gas mixture by exterior mixing.

FIG. 11 finally illustrates an embodiment of an injector tip 10 in which the third fuel constituent is fed by way of third feed ducts 3 to the first radial injector gap 6.

By way of the first feed ducts 1, an auxiliary combustion gas is fed which is accelerated in the first injector nozzle bores 11 to sonic speed and flows through the first radial injector gap at a high flow rate, which first radial injector gap 6 is fed by way of the second feed ducts 2 with any fuel gas. The highly accelerated gas currents, which emerge from the injector nozzle bores 11 and flow into the opposite mixing bores 18, pull along fuel gas from the first radial injector gap 6 so that a fuel gas—oxygen mixture emerges on the face of the injector tip. By way of the third feed ducts 3, which also lead into the first radial injector gap 6, nitrogen, for example, can be fed in case of flashback, when the outflow speed of the fuel gas—oxygen mixture is negative, to distinguish the flame forming in the mixing area by the addition of nitrogen.

It is another advantage of this technology that, by the admixing of any nitrogen proportions into the fuel gas, the flame temperature, the ignition speed and the combustion speed as well as the primary flame output of the ignited fuel gas—auxiliary combustion gas mixture can be manipulated arbitrarily. Thus, for example, the flame temperature of an ignited acetylene—oxygen mixture at a mixing ratio of 1 to 1.4 of 3,165° C. can be lowered by the admixing of nitrogen to approximately 50%, specifically to a temperature lower than 2,000° C.

The above-mentioned possibilities may be used very advantageously during HCOV spraying of low melting spraying materials, such as aluminum, zinc and copper materials.

Finally, it should be stressed that the teaching according to the invention is not limited to the above-mentioned embodiments. The teaching according to the invention can also be implemented in the case of injector tips of different designs.

I claim:

1. An injector tip for burning and mixing fuel constituents comprising:

first, second and third feed ducts respectively conveying first, second and third fuel constituents, and each being formed as an axial bore arranged on concentric circles, wherein for mixing of at least two of said fuel constituents, the first feed ducts lead into respective first injector nozzle bores having a reduced cross section, which in turn lead into a first radial injector gap, second feed ducts also respectively lead into the first radial injector gap, and the third feed ducts are provided such that mixing of the first, second, and third fuel constituent is implemented.

2. An injector tip according to claim 1 wherein the first feed ducts continue by way of the first injector nozzle bores and the first radial injector gap into first injector mixing nozzle bores which lead into a second radial injector gap, and the third feed ducts assigned to the third fuel constituent also lead into the second radial injector

3. An injector tip according to claim 1 wherein the third feed ducts assigned to the third fuel constituent also lead into the first radial injector gap.

4. An injector tip according to claim 2, wherein the first feed ducts, by way of the first and second radial injector gaps, continue in the first injector mixing nozzle bores.

5. An injector tip according to claim 1, wherein said third feed ducts assigned to the third fuel constituents lead into third injector nozzle bores having a reduced cross section.

6. An injector tip according to claim 5, wherein the third injector nozzle bores lead into the first radial injector gap.

7. An injector tip according to claim 5, wherein the first and the third feed ducts are arranged to be offset with respect to one another on respective circles.

8. An injector tip according to claim 5, wherein the first feed ducts, by way of the first injector nozzle bores and the first radial injector gap, continue in the first injector mixing nozzle bores and lead into a second radial injector gap, and in that the third feed ducts, by way of the third injector nozzle bores and the first radial injector gap, continue in third injector mixing nozzle bores and lead into the second radial injector gap, and wherein fourth feed ducts assigned to a fourth fuel constituent also lead into the second radial injector gap.

9. An injector tip according to claim 5, wherein the third injector nozzle bores lead into third injector mixing bores having an enlarged cross section, and fourth feed ducts assigned to a fourth fuel constituent also lead into the third injector mixing bores.

10. An injector tip according to claim 5, wherein the third injector nozzle bores lead into a second radial injector gap, and fourth feed ducts assigned to a fourth fuel constituent lead into the second radial injector gap.

11. An injector tip according to claim 5, wherein the first injector nozzle bores or the first injector mixing nozzle bores continue in first mixing bores, and the third injector nozzle bores or the third injector mixing nozzle bores continue in third mixing bores which are independent of the first mixing bores.

12. An injector tip according to claim 11, wherein the third feed ducts assigned to the third fuel constituent are constructed as atomizer nozzle bores for liquid fuel.

13. An injector tip according to claim 12, wherein the atomizer nozzle bores are constructed to be axial and/or focusing with respect to an axis of the injector tip.

14. An injector tip according to claim 13, wherein at least one other fuel constituent is guided by way of additional feed ducts independently of the first, second and third fuel constituent to a face of the injector tip.

15. An injector tip according to claim 14, wherein the additional feed ducts assigned to the at least one other fuel constituent lead into an angular gap, starting from which outlet bores extend to the face of the injector tip.

16. An injector tip according to claim 15, wherein first mixing bores are oriented to be axial and/or focusing on the face of the injector tip.

17. An injector tip according to claim 16, wherein the outlet bores are oriented to be axial and/or focusing on the face of the injector tip.

18. An injector tip according to claim 17, wherein a central bore is provided.

19. An injector tip according to claim 18, wherein the central bore leads into a central injector gap, the feed ducts assigned to a fuel constituent also lead into the central injector gap, and the central bore continues by way of the central injector gap, in a central mixing bore.

20. An injector tip for mixing and burning fuel constituents comprising:

an injector tip housing having a plurality of axial bores;

a plurality of first feed ducts for transporting a first fuel constituent, each of the first feed ducts corresponding to a respective first axial bore, of the plurality of axial bores, wherein each of the first feed ducts are concentrically arranged about a longitudinal axis of said injector tip housing;

a plurality of second feed ducts for transporting a second fuel constituent, each of the second feed ducts corresponding to a respective second axial bore, of the plurality of axial bores, wherein each of the second feed ducts are concentrically arranged about the longitudinal axis of said injector tip housing;

a plurality of nozzle bores each corresponding to an intersection with a respective first feed duct and a respective second feed duct, for transporting a mixture of said first fuel constituent and said second fuel constituent therethrough; and a plurality of third feed ducts intersecting respective distal ends of said plurality of nozzle bores, at a proximal end of a respective mixing bore, of a plurality of mixing bores, for transporting a third fuel constituent;

wherein the first fuel constituent, the second fuel constituent, and the third fuel constituent are mixed and transported through the plurality of mixing bores for burning at a distal end thereof.

21. An injector tip for mixing and burning fuel constituents having a longitudinal axis and a plurality of longitudinal bores disposed therein, said injector tip comprising:

a first group of bores of said plurality of longitudinal bores concentrically disposed about the longitudinal axis;

a second group of bores of said plurality of longitudinal bores concentrically disposed about the longitudinal axis apart from said first group of bores, each intersecting a respective bore of said first group of bores at a first radial injector gap;

a plurality of mixing nozzles of said plurality of longitudinal bores, each respectively connecting the first radial injector gap at proximal ends thereof;

a third group of bores of said plurality of bores concentrically disposed about the longitudinal axis apart from said first and second group of bores, each respectively connected to a distal end of said plurality of mixing nozzles; and a plurality of mixing bores each respectively connecting to the intersection of the plurality mixing nozzles and the third group of bores at a proximal end thereof.

22. The injector tip according to claim 21, the first group of bores each comprising a proximal section and a distal section wherein the distal section has a reduced cross sectional area from said proximal section.

* * * * *

UNITED STATES PATENT AND TRADEMARK OFFICE
CERTIFICATE OF CORRECTION

PATENT NO. : 5,535,953
DATED : July 16, 1996
INVENTOR(S) : HÜHNE ET AL.

It is certified that error appears in the above-indentified patent and that said Letters Patent is hereby corrected as shown below:

TITLE PAGE:

Item [30], change "42 39 903.3" to read --P4239903.3--.

Column 1, line 14, delete "the".

Column 2, line 62, change "--" to "-";
         line 63, change "--" to "-".

Column 5, line 25, change "were" to --are--.

Column 6, line 22, change "--" to "-";
         line 34, change "--" to "-";
         line 35, change "--" to "-";
         line 60, change "--" to "-".

Column 7, line 5, change "--" to "-";
         line 15, change "--" to "-";
         line 29, change "--" to "-";
         line 33, change "--" to "-";
         line 35, change "--" to "-";
         line 37, change "--" to "-";
         line 38, change "--" to "-";
         line 67, change "--" to "-".

Column 8, line 8, change "--" to "-";
         line 54, change "--" to "-".

UNITED STATES PATENT AND TRADEMARK OFFICE
CERTIFICATE OF CORRECTION

PATENT NO. : 5,535,953

DATED : July 16, 1996

INVENTOR(S) : HÜHNE ET AL.

It is certified that error appears in the above-indentified patent and that said Letters Patent is hereby corrected as shown below:

```
Column 9,  line 50, change "--" to "-";
           line 62, change "--" to "-";
           line 67, change "--" to "-".

Column 10, line 1,  change "--" to "-";
           line 3,  change "--" to "-";
           line 5,  change "--" to "-";
           line 6,  change "--" to "-";
           line 17, change "--" to "-";
           line 47, change "--" to "-";
           line 51, change "--" to "-";
           line 59, change "--" to "-".
```

UNITED STATES PATENT AND TRADEMARK OFFICE
CERTIFICATE OF CORRECTION

PATENT NO.   : 5,535,953
DATED        : July 16, 1996
INVENTOR(S)  : HUHNE ET AL It is certified that error appears in the above-indentified patent and that said Letters Patent is hereby corrected as shown below:

```
Column 11, line 5,  change "--" to "-";
           line 35, change "--" to "-";
           line 49, change "--" to "-".

Column 12, line 1,  change "--" to "-";
           line 5,  change "--" to "-";
           line 11, change "--" to "-";
           line 13, change "--" to "-".
```

Signed and Sealed this

Fifteenth Day of October, 1996

Attest:

BRUCE LEHMAN

Attesting Officer     Commissioner of Patents and Trademarks